US008879423B2

(12) United States Patent
Sun et al.

(10) Patent No.: US 8,879,423 B2
(45) Date of Patent: Nov. 4, 2014

(54) METHOD, MEDIA GATEWAY AND MOBILE SWITCHING CENTER EMULATION FOR REALIZING SWITCHING BY COPING TOPOLOGY

(75) Inventors: Meng Sun, Shenzhen (CN); Tianyong Long, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 96 days.

(21) Appl. No.: 13/514,033

(22) PCT Filed: May 17, 2010

(86) PCT No.: PCT/CN2010/072830
§ 371 (c)(1),
(2), (4) Date: Jun. 5, 2012

(87) PCT Pub. No.: WO2010/148827
PCT Pub. Date: Dec. 29, 2010

(65) Prior Publication Data
US 2012/0243439 A1 Sep. 27, 2012

(30) Foreign Application Priority Data
Dec. 9, 2009 (CN) .......................... 2009 1 0188697

(51) Int. Cl.
H04L 12/28 (2006.01)
H04W 36/00 (2009.01)
H04W 4/16 (2009.01)

(52) U.S. Cl.
CPC ............ *H04W 36/0016* (2013.01); *H04W 4/16* (2013.01)
USPC .............................. 370/254; 455/436; 455/442

(58) Field of Classification Search
USPC .................. 370/254, 329, 331; 455/436, 442
See application file for complete search history.

(56) References Cited

U.S. PATENT DOCUMENTS

| 2004/0235477 A1* | 11/2004 | Picha et al. | .................... 455/439 |
| 2006/0045102 A1* | 3/2006 | Pelaez et al. | .................. 370/401 |
| 2008/0146208 A1* | 6/2008 | Ejzak et al. | .................... 455/416 |
| 2008/0219183 A1* | 9/2008 | Yin | ............................... 370/254 |

FOREIGN PATENT DOCUMENTS

| CN | 1889757 A | 1/2007 |
| CN | 101170807 A | 4/2008 |
| KR | 20050007990 A | 1/2005 |
| WO | 2005022934 A2 | 3/2005 |

OTHER PUBLICATIONS

International Search Report for PCT/CN2010/072830.

* cited by examiner

*Primary Examiner* — Albert T Chou
(74) *Attorney, Agent, or Firm* — McClure, Qualey & Rodack, LLP

(57) ABSTRACT

The present invention discloses a method for realizing a handoff by replicating topology, including: a MGW receiving an ADD Command from a MSCe, adding a new Termination to a Context, and establishing a bearer to a target office or a target base station; receiving a MODIFY Command from the MSCe, and modifying properties of the new Termination; and receiving a SUBTRACT Command from the MSCe, removing an original Termination, and according to recorded information about relationship between the new Termination and the original Termination carried by a Handover Package in one Command, playing the Tone of the original Termination to the new Termination continuously and establishing the same topology connection between the new Termination and other Terminations in the Context. The present invention also discloses a system for realizing a handoff by replicating topology, a media gate-way and a mobile switching center emulation. The present invention completes the topology replication.

10 Claims, 5 Drawing Sheets

METHOD, MEDIA GATEWAY AND MOBILE SWITCHING CENTER EMULATION FOR REALIZING SWITCHING BY COPING TOPOLOGY

CROSS REFERENCE RELATED APPLICATIONS

This application is a national phase of PCT/CN2010/072830 filed May 17, 2010, which claims priority to China Application Serial No. 200910188697.9, filed Dec. 9, 2009, both of which are entirely incorporated herein by reference.

TECHNICAL FIELD

The present invention relates to the Code Division Multiple Access (CDMA) communication technology, and particularly, to a method for realizing handoff by replicating topology, a media gate-way (MGW) and a mobile switching center emulation (MSCe).

BACKGROUND OF THE RELATED ART

The CDMA wireless communication system is a wireless communication system which is applied more widely, and the CDMA wireless communication system realizes the separation of control and bearer at a legacy mobile station domain (LMSD) phase; wherein the core network of a circuit switching domain consists of an MSCe and an MGW, the MSCe controls the MGW mainly by an H.248 protocol, so as to realize the media plane bearer establishment and connection.

When a handoff of the MS (mobile station) occurs in the CDMA wireless communication system, the corresponding Anchor MSCe first controls the MGW to add a new Termination to the Context, so as to establish a bearer to a target office or a target base station; and when the handoff of the MS is completed, the new Termination is then used to replace an original Termination connected with the source base station. Since the handoff occurs, in order to ensure the voice service normally for the MS after the handoff, the topology connection relationship between other Terminations and the original Termination in the Context has to be reconnected to the new Termination after the handoff; and the playing tone of the original Termination is taken over to the new Termination.

During a research on the related art, inventors have found that, with the development of the voice service, the MS may carry out simultaneously services, such as customized ring back tone, conference calling, flexible alerting, etc., therefore, the topology relationship and playing tone of the original Termination will be very complicated; at the moment, if the replacement work of the new Termination and the original Termination is completed by the Anchor MSCe, the complexity is high, the extensibility is poor, and the handoff occurrence scenario will be limited.

CONTENT OF THE INVENTION

In view of this, embodiments of the present invention provide a method for realizing handoff by replicating topology, a media gate-way and a mobile switching center emulation, so as to realize that the topology replication of the new Termination and the original Termination is completed under the relatively lower complexity.

The object of the embodiments of the present invention is realized by the following technical solution.

A method for realizing a handoff by replicating topology, comprising:

receiving an ADD Command from a mobile switching center emulation, adding a new Termination to a Context, and establishing a bearer to a target office or a target base station;

receiving a MODIFY Command from the mobile switching center emulation, and modifying properties of the new Termination; and receiving a SUBTRACT Command from the mobile switching center emulation, removing an original Termination, according to information carried by a Handover Package in one Command, playing the Tone of the original Termination to the new Termination and establishing the same topology connection between the new Termination and other Terminations in the Context as the topology connection between the original Termination and the other Terminations.

Preferably, the Handover Package is sent by the ADD Command, or sent by the MODIFY Command, or sent by the SUBTRACT Command.

Preferably, the Handover Package sent by the SUBTRACT Command at least comprises information about the new Termination, and the Handover Package sent by the ADD Command or the MODIFY Command at least comprises information about the original Termination.

The embodiments of the present invention also provide a media gate-way, comprising:

a first receiving unit, adapted for receiving an ADD Command, a MODIFY Command and a SUBTRACT Command from a mobile switching center emulation; and a first enforcement unit, adapted for, after receiving the ADD Command, adding a new Termination to a Context, and establishing a bearer to a target office or a target base station; or after receiving the MODIFY Command, modifying properties of a new Termination; or after receiving the SUBTRACT Command, removing an original Termination, according to information carried by a Handover Package in one Command, playing the Tone of the original Termination to the new Termination and establishing the same topology connection between the new Termination and other Terminations in the Context as the topology connection between the original Termination and the other Terminations.

The embodiments of the present invention also provide a mobile switching center emulation, comprising:

a second receiving unit, adapted for receiving a handoff required message and a handoff commenced message from a source office or a source base station; and a second sending unit, adapted for, after receiving the handoff required message, sending an ADD Command to a media gate-way, sending a MODIFY Command to a media gate-way to modify properties of the new Termination, or sending a SUBTRACT Command to a media gate-way, so that the media gate-way, according to information carried by a Handover Package in one Command, plays the Tone of an original Termination to the new Termination and establishes the same topology connection between the new Termination and other Terminations in the Context as the topology connection between the original Termination and the other Terminations since the original Termination is removed.

The embodiments of the present invention also provide a system for realizing a handoff by replicating topology, comprising: a mobile switching center emulation and a media gate-way; wherein, the mobile switching center emulation is configured to receive a handoff required message and a handoff commenced message from a source office or a source base station, send an ADD Command, a MODIFY Command and a SUBTRACT Command to the media gate-way; and the media gate-way is configured to receive the ADD Command, the MODIFY Command and the SUBTRACT Command from the mobile switching center emulation; after receiving the ADD Command, add a new Termination to a Context, and establish a bearer to a target office or a target base station; after receiving the MODIFY Command, modify properties of the new Termination; and after receiving the SUBTRACT Command, remove an original Termination, and according to a recorded information about relationship between the new Termination and the original Termination carried by a Handover Package in one Command, play the Tone of the original Termination to the new Termination and establish the same topology connection between the new Termination and other Terminations in the Context as the topology connection between the original Termination and the other Terminations.

It can be seen from the above technical solution provided by the embodiments of the present invention that, the MGW in these embodiments can carry out replicating topology and relaying playing tone under the control of the MSCe to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

PREFERRED EMBODIMENTS OF THE PRESENT INVENTION

The technical solution of the present invention will be further described in detail in combination with the accompanying drawings and specific embodiments hereinafter, so that those skilled in the art can better understand the present invention and implement the same, however, the embodiments for exemplification do not act as the limitation to the present invention.

Figure 1:
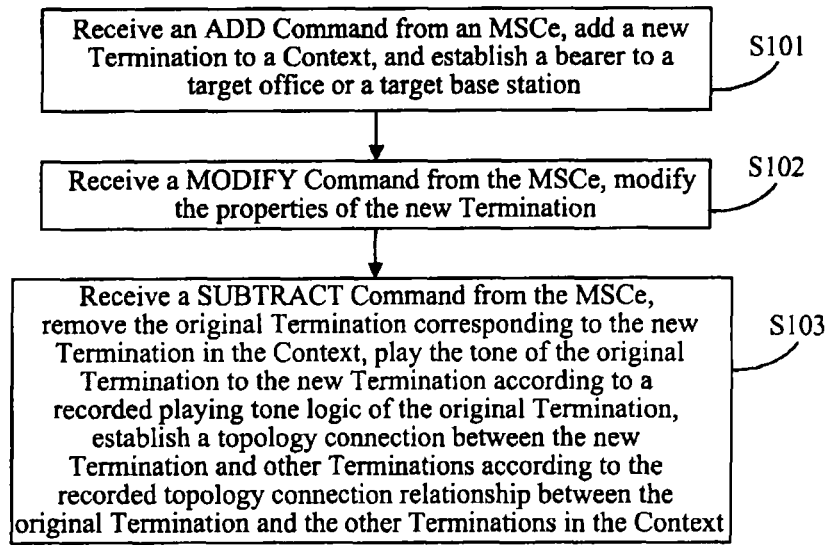
FIG. 1 is a flow chart of a method for realizing a handoff by replicating topology according to an embodiment one of the present invention.

The method for realizing a handoff by replicating topology provided by an embodiment of the present invention will be first introduced; and FIG. 1 describes a flow of an embodiment one of a method for realizing a handoff by replicating topology, and that embodiment describes a processing flow of an MGW, including:

in step S101, receiving an ADD Command from an MSCe, adding a new Termination to a Context, establishing a bearer to a target office or a target base station, and sending the response of ADD to the MSCe;

in step S102, receiving a MODIFY Command from the MSCe, modifying properties of the new Termination, and sending the response of MODIFY to the MSCe;

wherein, that MODIFY Command is sent by the MSCe after receiving the response of ADD;

In step S103, receiving a SUBTRACT Command from the MSCe, removing the original Termination, and according to recorded information about relationship between the new Termination and the original Termination carried by a Handover Package in one Command, playing the Tone of the original Termination to the new Termination and establishing the same topology connection between the new Termination and other Terminations in the Context as that between the original Termination and other Terminations;

specifically, the original Termination which corresponds to the new Termination in the Context is removed, the tone of the original Termination is played to the new Termination according to a recorded playing tone logic of the original Termination, and the topology connection between the new Termination and other Terminations is established according to the recorded topology connection relationship between the original Termination and the other Terminations in the Context;

wherein, a relay relationship between the new Termination and the original Termination is recorded after the Handover Package from the MSCe is received. In this case, the handoff specifically is a handoff from the original Termination to the new Termination. The Handover Package can be carried in the ADD Command, the MODIFY Command or the SUBTRACT Command.

It can be known from the above that, in the above embodiment, the MGW can carry out topology replication and playing tone relay under the control of the MSCe to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

Figure 2:
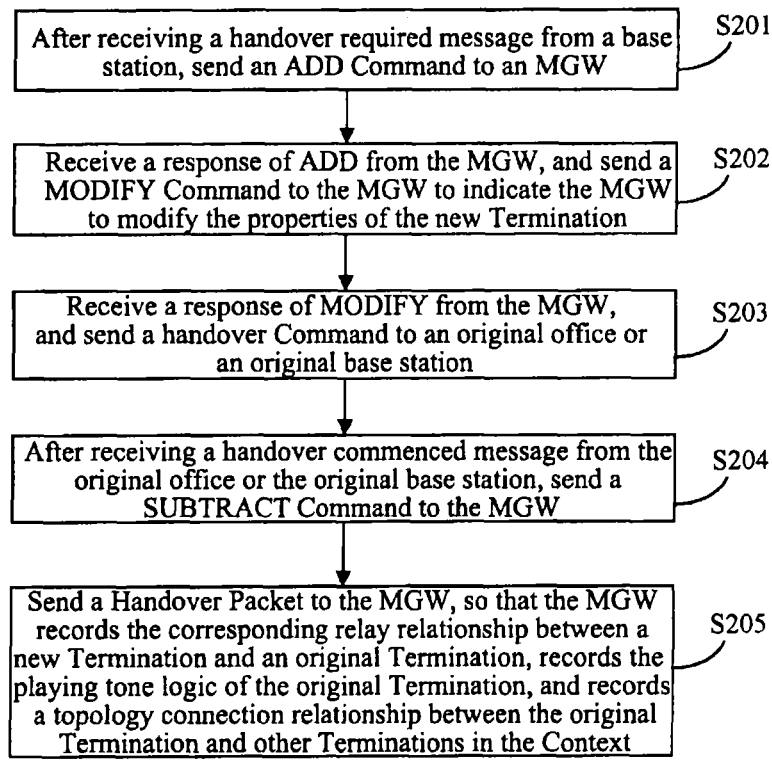
FIG. 2 is a flow chart of a method for realizing a handoff by replicating topology according to an embodiment two of the present invention.

FIG. 2 describes a flow of an embodiment two of a method for realizing a handoff by replicating topology, and that embodiment describes a processing flow of an MSCe, including:

in step S201, after receiving a handoff required message from a base station, sending an ADD Command to an MGW, so that the MGW adds a new Termination to a Context and establishes a bearer to a target office or a target base station;

in step S202, receiving a response of ADD from the MGW, and sending a MODIFY Command to the MGW so that the MGW modifies properties of a new Termination;

in step S203, receiving a response of MODIFY from the MGW, and sending a handoff Command to a source office or a source base station;

in step S204, after receiving a handoff commenced message from the source office or the source base station, sending a SUBTRACT Command to the MGW so that the MGW removes the original Termination corresponding to the new Termination in a Context;

in step S205, sending a Handover Package to the MGW, so that the MGW records a corresponding relay relationship between the new Termination and the original Termination, records a playing tone logic of the original Termination, and records a topology connection relationship between the original Termination and other Terminations in the Context, wherein the original Termination corresponds to the new Termination; so that the MGW plays the Tone of the original Termination to the new Termination continuously according to the recorded playing tone logic, and establishes the same topology connection between the new Termination and other Terminations in the Context according to the recorded topology connection relationship.

In this case, the recording in step S205 can be performed simultaneously with step S201, or step S202, or step S204, since the Handover Package can be sent by including in the ADD Command, or the MODIFY Command, or the SUBTRACT Command.

It can be known from the above that, in the above embodiment, the MSCe can control the MGW, so that the MGW carries out topology replication and playing tone relay to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

Figure 3:
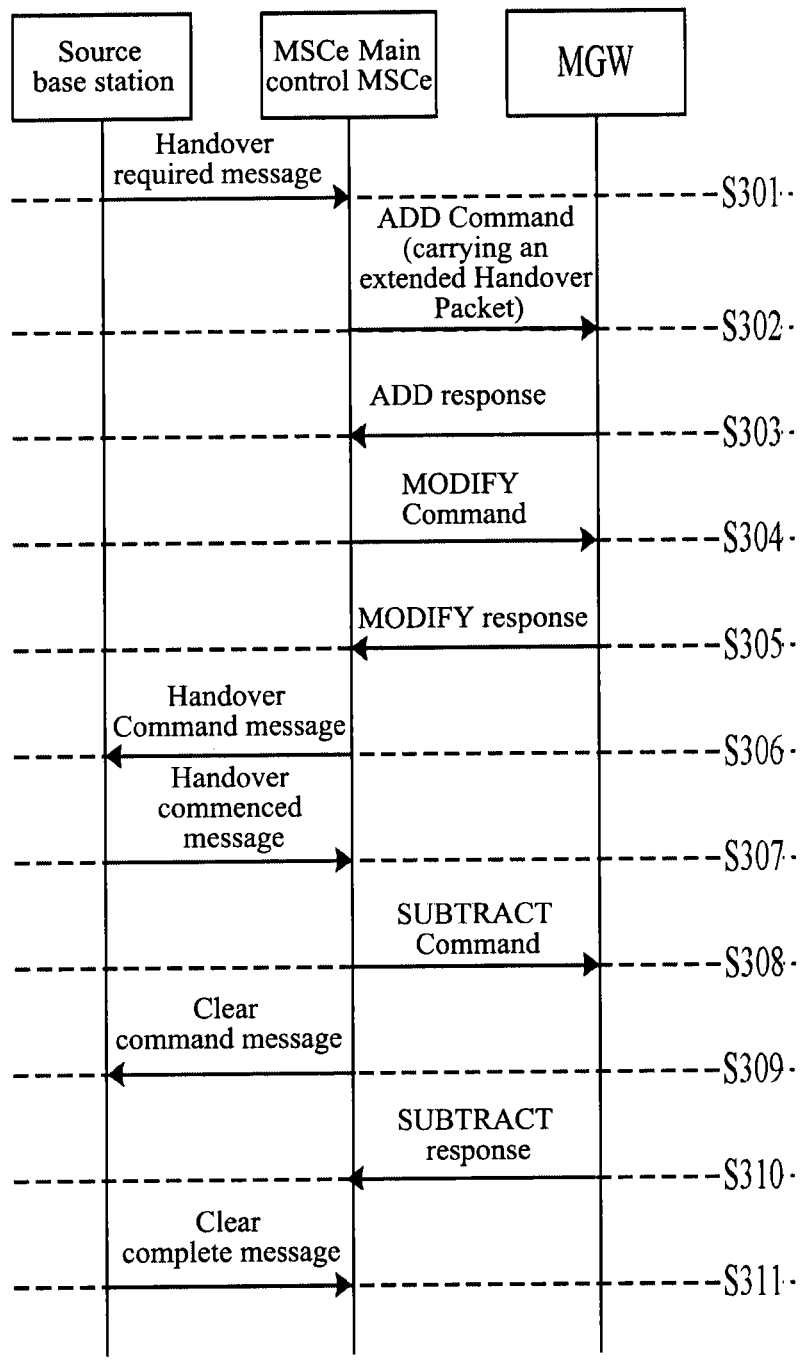
FIG. 3 is a signaling flow chart of a method for realizing a handoff by replicating topology according to an embodiment three of the present invention.

FIG. 3 describes a signaling flow of an embodiment three of a method for realizing a handoff by replicating topology; the signaling flow includes the following steps.

In step S301, the Anchor MSCe receives a handoff required message of the source office or the source base station.

In step S302, the Anchor MSCe sends an ADD Command to the MGW, and the ADD Command carries an extended Handover Package which includes information about the original Termination and the flag for playing tone relay and replicating topology.

In step S303, the MGW receives the ADD Command, adds a new Termination to the Context, and establishes a bearer to the target office or the target base station; at the same time, records the information (the corresponding relay relationship between the new Termination and the original Termination, the playing tone logic of the original Termination and the topology connection relationship between the original Termination and the other Terminations in the Context) carried in the Handover Package; and replies with the response of ADD to the MSCe.

In step S304, the Anchor MSCe according to the media negotiation result with the target office or the target base station, sends a MODIFY Command to the MGW to indicate the MGW to modify the properties of the new Termination.

In step S305, the MGW receives the MODIFY Command, modifies the properties of the Termination, and replies with the response of MODIFY to the MSCe.

In step S306, the Anchor MSCe sends a handoff Command message to the source base station.

In step S307, the Anchor MSCe receives a handoff commenced message sent by the source base station.

In step S308, after judging that the handoff is completed, the Anchor MSCe sends a SUBTRACT Command to the MGW to indicate the MGW to remove the original Termination in the Context.

In step S309, the Anchor MSCe sends a clear command message to the source base station.

In step S310, the MGW receives the SUBTRACT Command, removes the original Termination in the Context, plays the Tone of the original Termination to the new Termination continuously and establishes the same topology connection between the new Termination and other Terminations in the Context as that between the original Termination and the other Terminations;

specifically, the MGW plays the Tone of the original Termination to the new Termination according to the recorded playing tone logic, and makes the new Termination topologically connect the other Terminations according to the recorded topology connection relation, so as to complete the topology replication from the original Termination to the new Termination; and replies with the response of SUBTRACT to the MSCe.

In step S311, the Anchor MSCe receives a clear complete message sent by the source base station.

It can be known from the above that, in the above embodiment, the MSCe can control the MGW, so that the MGW carries out topology replication and playing tone relay to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

Figure 4:
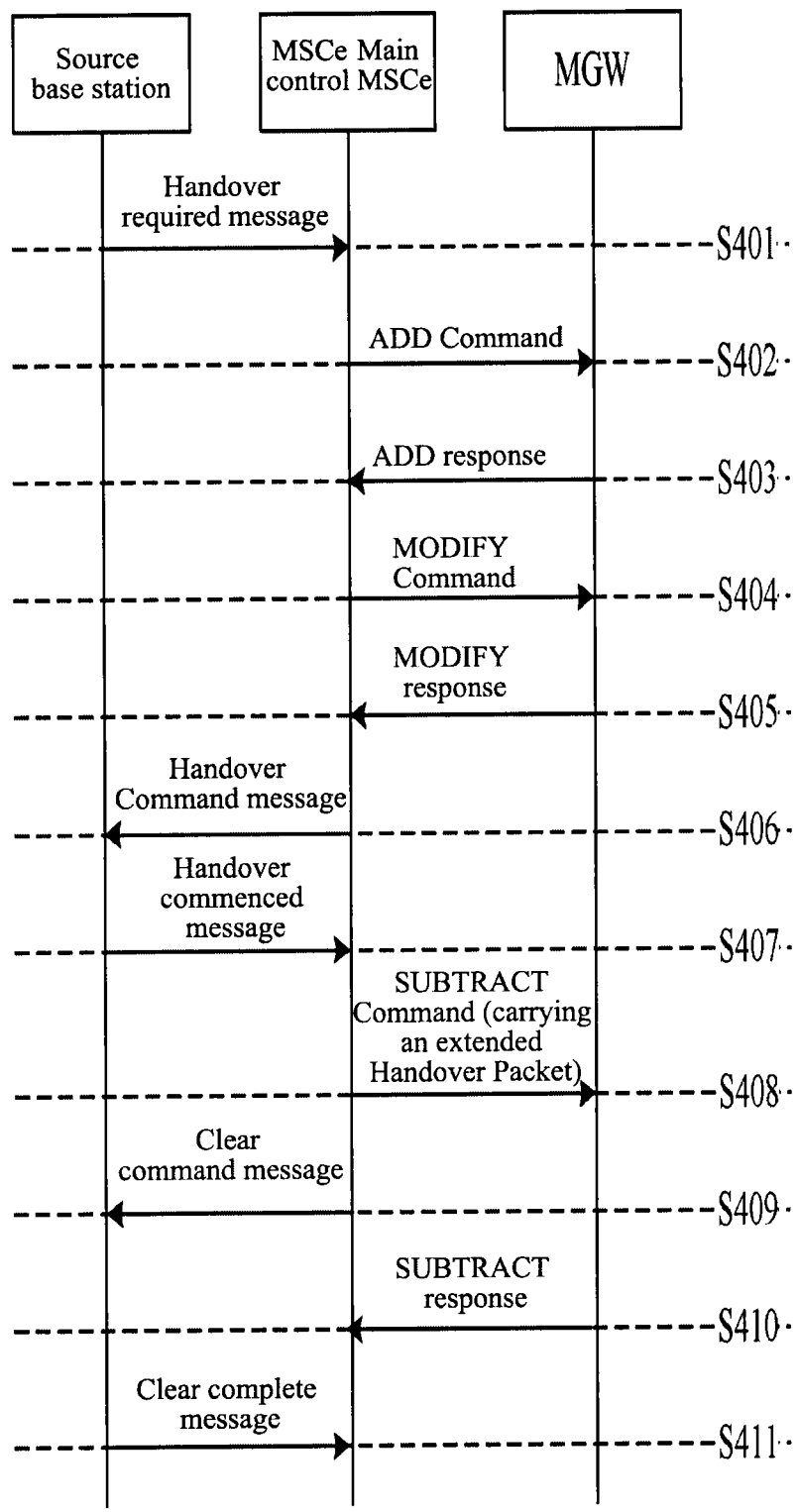
FIG. 4 is a signaling flow chart of a method for realizing a handoff by replicating topology according to an embodiment four of the present invention.

FIG. 4 describes a signaling flow of an embodiment four of a method for realizing a handoff by replicating topology; the signaling flow includes the following steps.

In step S401, the Anchor MSCe receives a handoff required message of a base station.

In step S402, the MSCe sends an ADD Command to the MGW.

In step S403, the MGW receives the ADD Command, adds a new Termination to the Context, establishes a bearer to the target office or the target base station; and replies with the response of ADD to the MSCe.

In step S404, the Anchor MSCe according to the media negotiation result with the target office or the target base station, sends a MODIFY Command to the MGW to indicate the MGW to modify the properties of the new Termination.

In step S405, the MGW receives the MODIFY Command, modifies the properties of the Termination, and replies with the response of MODIFY to the MSCe.

In step S406, the Anchor MSCe sends a handoff Command message to the source base station.

In step S407, the Anchor MSCe receives a handoff commenced message sent by the source base station.

In step S408, after the Anchor MSCe judges that the handoff is completed, the MSCe sends a SUBTRACT Command to the MGW to indicate the MGW to remove the original Termination in the Context, and the SUBTRACT Command carries an extended Handover Package which includes information about the new Termination and the flag for playing tone relay and replicating topology.

In step S409, the Anchor MSCe sends a clear command message to the source base station.

In step S410, the MGW receives the SUBTRACT Command, records the playing tone logic of the original Termination and the topology connection relationship between the original Termination and other Terminations in the Context according to the information carried in the Handover Package; removes the original Termination corresponding to the new Termination in the Context, plays the Tone of the original Termination to the new Termination continuously and establishes the same topology connection between the new Termination and other Terminations in the Context as the original;

specifically, the MGW_plays the Tone of the original Termination to the new Termination according to the recorded playing tone logic, and makes the new Termination topologically connect the other Terminations according to the recorded topology connection relation, so as to complete the topology replication from the original Termination to the new Termination; and replies with the response of SUBTRACT to the MSCe.

In step S411, the Anchor MSCe receives a clear complete message sent by the source base station.

It can be known from the above that, in the above embodiment, the MSCe can control the MGW, so that the MGW carries out topology replication and playing tone relay to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

Figure 5:
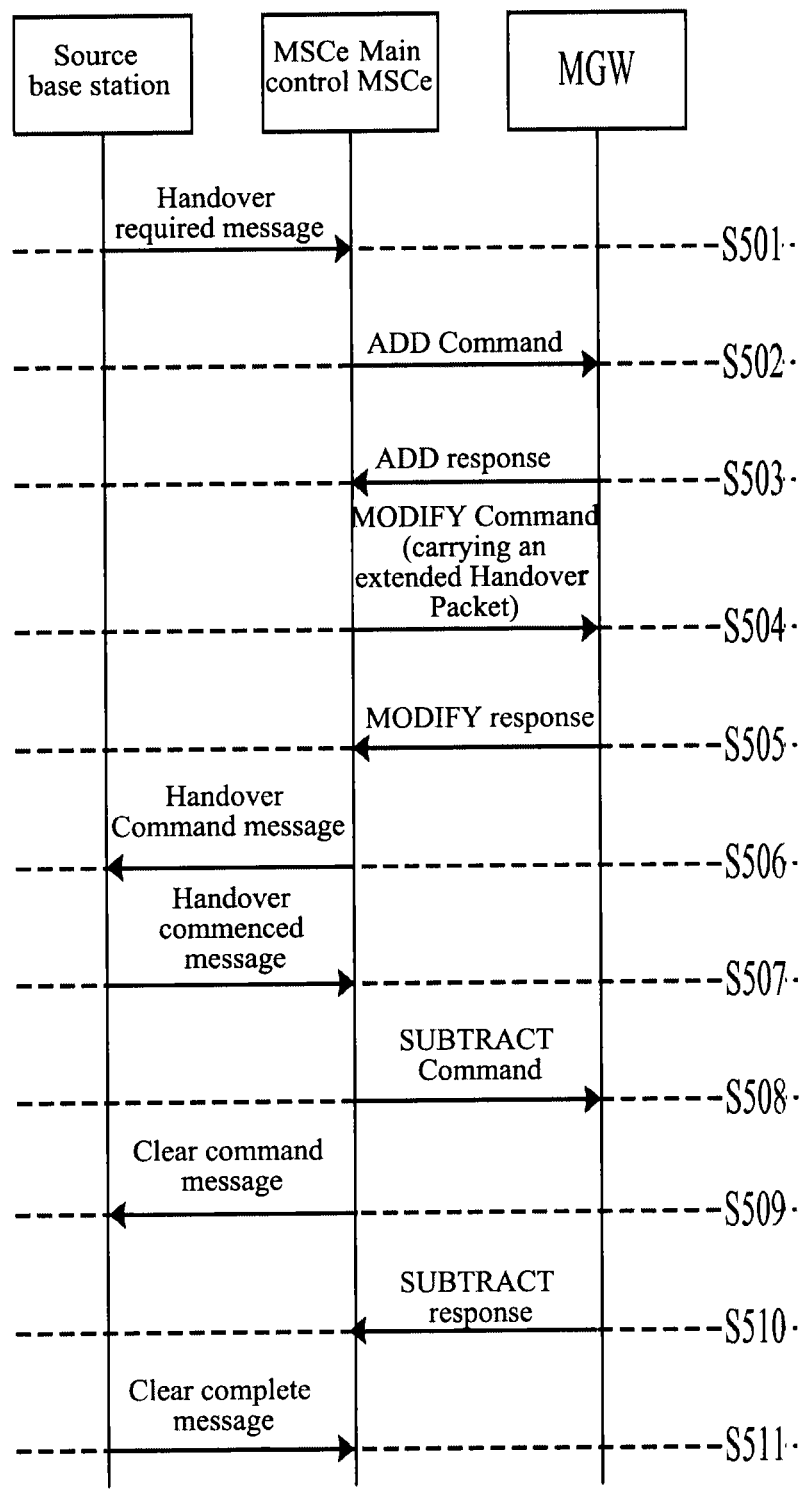
FIG. 5 is a signaling flow chart of a method for realizing a handoff by replicating topology according to an embodiment five of the present invention.

FIG. 5 describes a signaling flow of an embodiment five of a method for realizing a handoff by replicating topology, and the signaling flow includes the following steps.

In step S501, the Anchor MSCe receives a handoff required message of a base station.

In step S502, the MSCe sends an ADD Command to the MGW.

In step S503, the MGW receives the ADD Command, adds a new Termination to the Context, and establishes a bearer to the target office or the target base station; and replies with the response of ADD to the MSCe.

In step S504, the Anchor MSCe according to the media negotiation result with the target office or the target base station, sends a MODIFY Command to the MGW to indicate the MGW to modify the properties of the new Termination; the MODIFY Command carries an extended Handover Package which includes information about the original Termination and the flag for playing tone relay and replicating topology.

In step S505, the MGW receives the MODIFY Command, modifies the properties of the Termination, at the same time, records the information (the corresponding relay relationship between the new Termination and the original Termination, the playing tone logic of the original Termination and the topology connection relationship between the original Termination and the other Terminations in the Context) carried in the Handover Package; and replies with the response of MODIFY to the MSCe.

In step S506, the Anchor MSCe sends a handoff Command message to the source base station.

In step S507, the Anchor MSCe receives a handoff commenced message sent by the source base station.

In step S508, the Anchor MSCe judges that the handoff is completed, and the MSCe sends a SUBTRACT Command to the MGW.

In step S509, the Anchor MSCe sends a clear command message to the source base station.

In step S510, the MGW receives the SUBTRACT Command, removes the original Termination in the Context, plays the Tone of the original Termination to the new Termination continuously and establishes the same topology connection between the new Termination and other Terminations in the Context as the original;

specifically, the MGW plays the Tone of the original Termination to the new Termination according to the recorded playing tone logic, and makes the new Termination topologically connect the other Terminations according to the recorded topology connection relation, so as to complete the topology replication from the original Termination to the new Termination; and replies with the response of SUBTRACT to the MSCe.

In step S511, the Anchor MSCe receives a clear complete message sent by the source base station.

It can be known from the above that, in the above embodiment, the MSCe can control the MGW, so that the MGW carries out topology replication and playing tone relay to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

Figure 6:
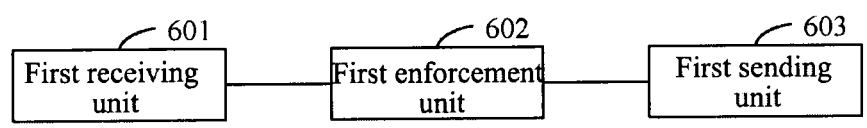
FIG. 6 is a structure diagram of a media gate-way according to an embodiment of the present invention.

FIG. 6 describes a structure of an embodiment of a media gate-way which includes: a first receiving unit 601, adapted for receiving an ADD Command, a MODIFY Command and a SUBTRACT Command from an MSCe;

a first enforcement unit 602, adapted for, after receiving the ADD Command, adding a new Termination to the Context, and establishing a bearer to the target office or the target base station; or, after receiving the MODIFY Command, modifying the properties of the new Termination; or, after receiving the SUBTRACT Command, removing the original Termination, and according to the recorded information about relationship between the new Termination and the original Termination carried by a Handover Package in one Command, playing the Tone of the original Termination to the new Termination continuously and establishing the same topology connection between the new Termination and other Terminations in the Context as the original; wherein, for concreteness, after receiving the SUBTRACT Command, removing the original Termination corresponding to the new Termination in the Context, playing the tone of the original Termination to the new Termination according to the playing tone logic of the original termination, and establishing a topology connection between the new Termination and other Terminations according to the recorded topology connection relationship between the original Termination and the other Terminations in the Context;

a first sending unit 603, adapted for, after the first enforcement unit 602 establishes a bearer to the target office or the target base station, sending an ADD response to the MSCe; after the first enforcement unit 602 modifies the properties of the new Termination, sending a MODIFY response to the MSCe; and, after the first enforcement unit 602 removing the original Termination corresponding to the new Termination in the Context, sending a SUBTRACT response to the MSCe.

It can be known from the above that, in the above embodiment, the MGW can carry out topology replication and playing tone relay under the control of the MSCe to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

Figure 7:
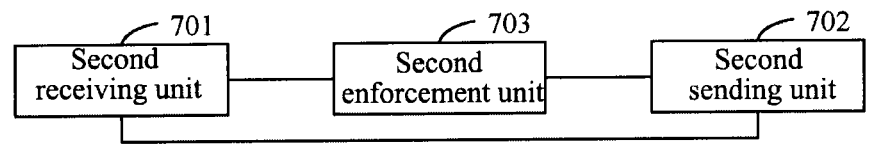
FIG. 7 is a structure diagram of a mobile switching center emulation according to an embodiment of the present invention.

FIG. 7 describes a structure of an embodiment of a mobile switching center emulation which includes:

a second receiving unit 701, adapted for receiving a handoff required message and a handoff commenced message from a source office or a source base station; and receiving an ADD response, a MODIFY response, and a SUBTRACT response from an MGW;

a second sending unit 702, adapted for, after receiving the handoff required message, sending an ADD Command to the MGW so as to enable the MGW to add a new Termination to a Context and establish a bearer to a target office or a target base station; or, sending a MODIFY Command to the MGW so as to enable the MGW to modify the properties of the new Termination; or, after receiving a MODIFY response, sending a handoff Command to the source office or the source base station; or, after receiving a handoff commenced message, sending a SUBTRACT Command to the MGW so as to enable the MGW to remove the original Termination corresponding to the new Termination in the Context; or, sending a Handover Package to the MGW so as to enable the MGW to play the Tone of the original Termination to the new Termination continuously and establish the same topology connection between the new Termination and other Terminations in the Context as the original according to the information carried in the Handover Package in one Command;

specifically, the second sending unit 702 is adapted for sending the Handover Package to the MGW so as to enable the MGW to_record a corresponding relay relationship between the new Termination and the original Termination, record the playing tone logic of the original Termination, and record the topology connection relationship between the original Termination and other Terminations in the Context; and enable the MGW to play the tone of the original Termination to the new Termination according to the recorded playing tone logic, and establish the topology connection between the new Termination and the other Terminations according to the recorded topology connection relationship.

a second enforcement unit 703, adapted for, after the second receiving unit 701 receives the ADD response, modifying the properties of the Termination established by the current end.

It can be known from the above that, in the above embodiment, the MSCe can control the MGW, so that the MGW carries out topology replication and playing tone relay to realize establishment and connection of the bearer during the handoff; therefore, the operation complexity of the Termination during the handoff can be reduced to a great extent, thus, the replacement operation between the new Termination and the original Termination can be completed with relatively lower complexity, which is helpful to improve stability and extensibility of the system.

Furthermore, an embodiment of the present invention also provides a system for realizing a handoff by replicating topology which includes the above MSCe and MGW. The MSCe in the system receives a handoff required message and a handoff commenced message from the source office or the source base station, sends an ADD Command, a MODIFY Command and a SUBTRACT Command to the MGW; and the MGW receives the ADD Command, MODIFY Command and SUBTRACT Command from the MSCe, removes the original Termination, according to the information carried in the Handover Package in one Command, plays the Tone of the original Termination to the new Termination continuously and establishes the same topology connection between the new Termination and other Terminations in the Context as the original; that is, the MGW receives the ADD Command, MODIFY Command and SUBTRACT Command from the MSCe, removes the original Termination corresponding to the new Termination in the Context, plays the tone of the original Termination to the new Termination according to the playing tone logic of the original Termination, and establishes a topology connection between the new Termination and other Terminations according to the recorded topology connection relationship between the original Termination and the other Terminations in the Context.

The above description is merely preferred embodiments of the present invention and not intended to limit the patent scope of the present invention, and any equivalent structures or equivalent flow variations made by using the specification and accompanying drawings of the present invention are applied directly or indirectly in other relevant technical fields and also included in the scope of patent protection of the present invention.

What we claimed is:

1. A method for realizing handoff by replicating topology in a media gate-way (MGW), comprising:

receiving an ADD Command from a mobile switching center emulation, adding a new Termination to a Context, and establishing a bearer to a target office or a target base station;

receiving a MODIFY Command from the mobile switching center emulation, and modifying properties of the new Termination; and receiving a SUBTRACT Command from the mobile switching center emulation, removing an original Termination, playing the Tone of the original Termination to the new Termination according to a recorded playing tone logic, and establishing the same topology connection between the new Termination and other Terminations in the Context as the topology connection between the original Termination and the other Terminations by making the new Termination topologically connect the other Terminations according to a recorded topology connection relation, so as to complete the topology replication from the original Termination to the new Termination, wherein, the recorded playing tone logic and the recorded topology connection relation have been recorded in the MGW according to information about the new Termination and the flag for playing tone relay and replicating topology carried by a Handover Package in one of the ADD Command, the MODIFY Command and the SUBTRACT Command.

2. The method as claimed in claim 1, wherein, the Handover Package is sent by the ADD Command, or sent by the MODIFY Command, or sent by the SUBTRACT Command.

3. The method as claimed in claim 1, wherein, the relay relationship between the new Termination and the original Termination is recorded after the Handover Package from the mobile switching center emulation is received.

4. The method as claimed in claim 2, wherein, the Handover Package sent by the SUBTRACT Command at least comprises information about the new Termination, and the Handover Package sent by the ADD Command or the MODIFY Command at least comprises information about the original Termination.

5. A media gate-way, comprising:

a first receiving unit, adapted for receiving an ADD Command, a MODIFY Command and a SUBTRACT Command from a mobile switching center emulation; and a first enforcement unit, adapted for, after receiving the ADD Command, adding a new Termination to a Context, and establishing a bearer to a target office or a target base station; after receiving the MODIFY Command, modifying properties of a new Termination; and after receiving the SUBTRACT Command, removing an original Termination, playing the Tone of the original Termination to the new Termination according to a recorded playing tone logic, and establishing the same topology connection between the new Termination and other Terminations in the Context as the topology connection between the original Termination and the other Terminations by making the new Termination topologically connect the other Terminations according to a recorded topology connection relation, so as to complete the topology replication from the original Termination to the new Termination, wherein, the recorded playing tone logic and the recorded topology connection relation have been recorded in the MGW according to information about the new Termination and the flag for playing tone relay and replicating topology carried by a Handover Package in one of the ADD Command, the MODIFY Command and the SUBTRACT Command.

6. A mobile switching center emulation, comprising:
a second receiving unit, adapted for receiving a handoff required message and a handoff commenced message from a source office or a source base station; and
a second sending unit, adapted for, after receiving the handoff required message, sending an ADD Command to a media gate-way, sending a MODIFY Command to a media gate-way to modify properties of the new Termination, sending a SUBTRACT Command to a media gate-way and removing the original Termination, so that the media gate-way, plays the Tone of an original Termination to the new Termination according to a recorded playing tone logic, and establishes the same topology connection between the new Termination and other Terminations in the Context as the topology connection between the original Termination and the other Terminations by making the new Termination topologically connect the other Terminations according to a recorded topology connection relation, so as to complete the topology replication from the original Termination to the new Termination, wherein,
the recorded playing tone logic and the recorded topology connection relation have been recorded in the MGW according to information about the new Termination and the flag for playing tone relay and replicating topology carried by a Handover Package in one of the ADD Command, the MODIFY Command and the SUBTRACT Command.

7. The mobile switching center emulation as claimed in claim 6, wherein, the Handover Package is sent to the media gate-way by the ADD Command, or by the MODIFY Command, or by the SUBTRACT Command.

8. A system for realizing a handoff by replicating topology, comprising: a mobile switching center emulation and a media gate-way; wherein,
the mobile switching center emulation is configured to receive a handoff required message and a handoff commenced message from a source office or a source base station, send an ADD Command, a MODIFY Command and a SUBTRACT Command to the media gate-way; and
the media gate-way is configured to receive the ADD Command, the MODIFY Command and the SUBTRACT Command from the mobile switching center emulation; after receiving the ADD Command, add a new Termination to a Context, and establish a bearer to a target office or a target base station; after receiving the MODIFY Command, modify properties of the new Termination; and after receiving the SUBTRACT Command, remove an original Termination, play the Tone of the original Termination to the new Termination according to a recorded playing tone logic, and establish the same topology connection between the new Termination and other Terminations in the Context as the topology connection between the original Termination and the other Terminations by making the new Termination topologically connect the other Terminations according to a recorded topology connection relation, so as to complete the topology replication from the original Termination to the new Termination, wherein,
the recorded playing tone logic and the recorded topology connection relation have been recorded in the MGW according to information about the new Termination and the flag for playing tone relay and replicating topology carried by a Handover Package in one of the ADD Command, the MODIFY Command and the SUBTRACT Command.

9. The system as claimed in claim 8, wherein, the Handover Package is sent to the media gate-way by the ADD Command, or by the MODIFY Command, or by the SUBTRACT Command.

10. The system as claimed in claim 9, wherein, the Handover Package sent by the SUBTRACT Command at least comprises information about the new Termination, and the Handover Package sent by the ADD Command or the MODIFY Command at least comprises information about the original Termination.

* * * * *